US010164500B2

(12) United States Patent
Strattan et al.

(10) Patent No.: US 10,164,500 B2
(45) Date of Patent: Dec. 25, 2018

(54) SIGNAL BYPASS ROUTED THROUGH A MOTOR OF AN ELECTRICAL SUBMERSIBLE PUMP

(71) Applicant: Baker Hughes, a GE Company, LLC, Houston, TX (US)

(72) Inventors: Scott C. Strattan, Broken Arrow, OK (US); Peter F. Lawson, Tulsa, OK (US); Sean A. Cain, Tulsa, OK (US); John M. Knapp, Claremore, OK (US)

(73) Assignee: Baker Hughes, a GE Company, LLC, Houston, TX (US)

( * ) Notice: Subject to any disclaimer, the term of this patent is extended or adjusted under 35 U.S.C. 154(b) by 177 days.

(21) Appl. No.: 15/170,141

(22) Filed: Jun. 1, 2016

(65) Prior Publication Data
US 2016/0359388 A1    Dec. 8, 2016

Related U.S. Application Data

(60) Provisional application No. 62/169,965, filed on Jun. 2, 2015.

(51) Int. Cl.
| H02K 5/132 | (2006.01) |
| H02K 5/22 | (2006.01) |
| H02K 11/30 | (2016.01) |
| F04D 13/10 | (2006.01) |
| F04D 15/02 | (2006.01) |
| E21B 17/02 | (2006.01) |

(52) U.S. Cl.
CPC ........... *H02K 5/132* (2013.01); *E21B 17/023* (2013.01); *F04D 13/10* (2013.01); *F04D 15/0281* (2013.01); *H02K 5/225* (2013.01); *H02K 11/30* (2016.01)

(58) Field of Classification Search
CPC ........ H02K 5/132; H02K 5/225; H02K 11/30; E21B 17/023; F04D 13/10; F04D 15/0281
USPC .......................................................... 310/87
See application file for complete search history.

(56) References Cited

U.S. PATENT DOCUMENTS

| 1,449,577 A | 3/1923 | Bergstrom et al. |
| 1,655,824 A | 1/1928 | Schmidt |
| 2,188,398 A | 1/1940 | Bernard |
| 2,887,061 A | 5/1959 | Cametti et al. |

(Continued)

OTHER PUBLICATIONS

Aug. 24, 2016 International Search Report and Written Opinion of corresponding PCT/US2016/035284.

*Primary Examiner* — Michael Andrews
(74) *Attorney, Agent, or Firm* — Bracewell LLP; James E. Bradley

(57) ABSTRACT

An electrical submersible pumping system includes a well fluid pump driven by a three-phase motor. The motor has a stack of motor laminations mounted in a housing. The motor laminations have axially aligned slots spaced circumferentially around a bore. Motor windings are wound through the slots for receiving three-phase power provided to the motor. At least one set of three control lines extend axially through the motor laminations radially outward from the bore and equally spaced around the axis, The control lines may extend through channels on the outer diameter of the motor laminations. The control lines may also extend through the same slots that contain the windings. The control lines extend to a downhole element below the motor for controlling the downhole element.

19 Claims, 4 Drawing Sheets

(56) References Cited

U.S. PATENT DOCUMENTS

| | | |
|---|---|---|
| 7,093,675 B2 | 8/2006 | Pia |
| 7,208,855 B1 * | 4/2007 | Floyd .................... H02K 5/225 310/87 |
| 7,513,755 B2 | 4/2009 | Geisinger et al. |
| 8,222,792 B2 | 7/2012 | Platon et al. |
| 8,633,623 B2 | 1/2014 | Bingler |
| 8,708,664 B2 | 4/2014 | Brookbank |
| 2007/0224056 A1 * | 9/2007 | Watson .................. H02K 5/132 310/87 |
| 2008/0023177 A1 | 1/2008 | Hassett et al. |
| 2009/0091202 A1 | 4/2009 | Parmeter et al. |
| 2011/0133582 A1 | 6/2011 | Bingler |
| 2014/0159550 A1 * | 6/2014 | O'Bryan ................. H02K 5/132 310/68 B |

* cited by examiner

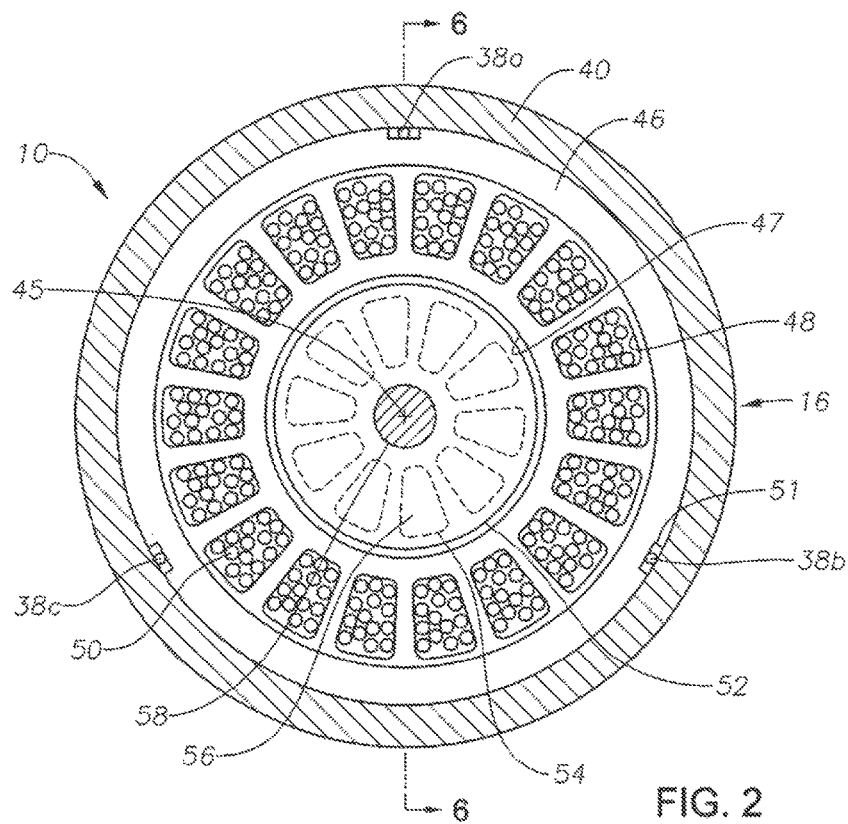
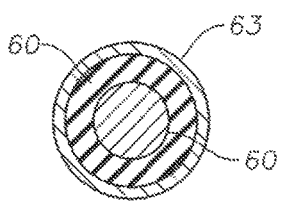
FIG. 3
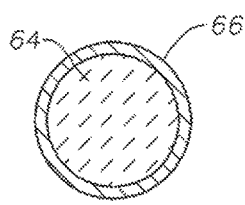
FIG. 4
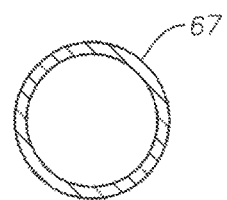
FIG. 5

SIGNAL BYPASS ROUTED THROUGH A MOTOR OF AN ELECTRICAL SUBMERSIBLE PUMP

CROSS REFERENCE TO RELATED APPLICATION

This application claims priority to provisional application 62/169,965, filed Jun 2, 2015.

BACKGROUND OF THE INVENTION

1. Field of Invention

The present disclosure relates to downhole pumping systems submersible in well bore fluids. More specifically, the present disclosure relates to an electrical submersible pump having a motor with a signal bypass medium routed through the motor.

2. Description of Prior Art

Submersible pumping systems are often used in hydrocarbon producing wells for pumping fluids from within the wellbore to the surface. These fluids are generally liquids made up of produced liquid hydrocarbon and often water. One type of system used in this application employs an electrical submersible pump ("ESP") system. ESP systems include a pump operated by an electrically powered motor for pressurizing the fluid. Pressurized fluid is discharged from the pump and into production tubing, or by other means, for conveyance to surface. Often, electrical power may be supplied to the motor via an electrical power cable from the surface that is strapped alongside the tubing. The power cable is sometimes part of an umbilical that extends from the surface; the umbilical can also include control lines for operation of completion equipment disposed in the wellbore below the ESP system.

The ESP system is sometimes disposed at the end of a length of production tubing deployed in the wellbore, with its discharge coupled to the tubing inlet. Other configurations have the ESP system set within the production tubing itself, which is sometimes referred to as a slimhole application. In these slimhole applications, the control lines are typically routed between the motor of the ESP system and inner surface of the tubing or casing, which further restricts the available space in the production tubing for deploying the ESP system. Moreover, the control lines are vulnerable to damage during installation when routed between the ESP system and tubing or casing.

SUMMARY OF THE INVENTION

An electrical submersible pumping ("ESP") system comprises a well fluid pump and a three-phase motor operatively connected to the pump. The motor has a housing with a longitudinal axis. A stack of motor laminations is mounted in the housing, the motor laminations having axially aligned slots spaced circumferentially around a bore. Motor windings are wound through the slots for receiving three-phase power provided to the motor. At least one set of three control lines extend axially through the motor laminations radially outward from the bore and equally spaced around the axis.

The system includes at least one set of three upper control line connectors at an upper end of the motor and at least one set of three lower control line connectors at a lower end of the motor. Each of the control lines extends between one of the upper control line connectors and one of the lower control line connectors.

A downhole element is mounted below the motor. Each of the control lines extends to the downhole element.

A controller is adapted to be mounted adjacent a wellhead. The control lines extend to the controller.

At least one of the control lines may be an insulated electrical wire. The electrical may be surrounded by a steel outer layer. At least one of the control lines may be a fiber optic line. The fiber optic line may be located within a steel tube. At least one of the control lines may be a steel tube having a passage for conveying a fluid.

In one embodiment, at least one set of three axially aligned channels extends axially along an outer diameter of the motor laminations and are equally spaced around the axis. The channels are spaced radially outward from the slots. Each of the control lines extends through one of the axially aligned channels.

In another embodiment, each of the control lines extends through one of the slots that also contains some of the motor windings.

BRIEF DESCRIPTION OF DRAWINGS

Some of the features and benefits of the present invention having been stated, others will become apparent as the description proceeds when taken in conjunction with the accompanying drawings, in which:

FIG. 2 is a sectional view of a portion of the ESP system of FIG. 1, taken along the line 2-2 of FIG. 1 and shown having control lines passing through the motor.

FIG. 3 is a sectional view of one type of control line that may pass through the motor.

FIG. 4 is a sectional view of a second type of control line that may pass through the motor.

FIG. 5 is a sectional view of a third type of control line that may pass through the motor.

Figure 1:
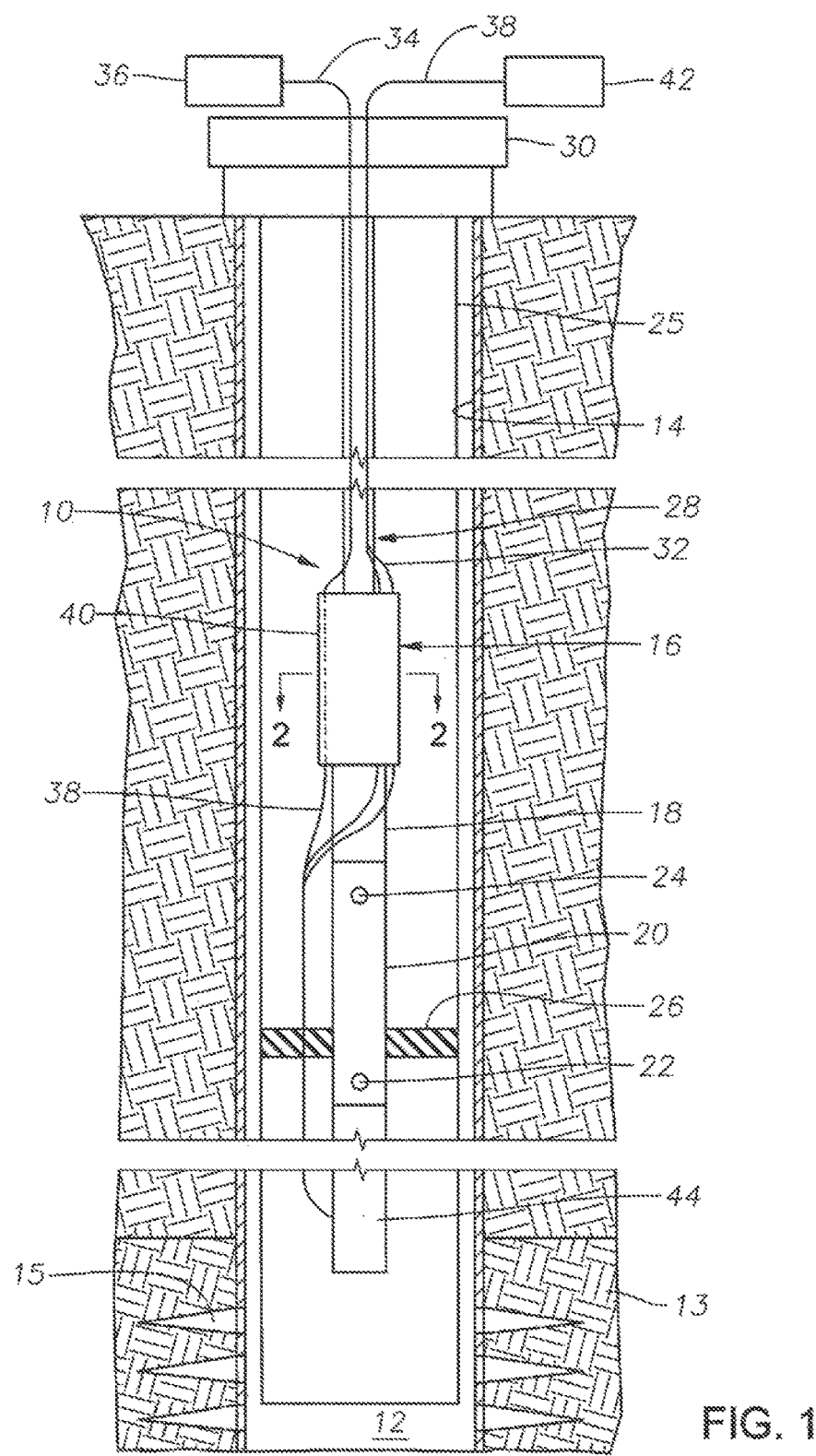
FIG. 1 is a partial sectional and schematic view of an example of an ESP system disposed in a wellbore.

While the invention wilt be described in connection with the preferred embodiments, it will be understood that it is not intended to limit the invention to that embodiment. On the contrary, it is intended to cover all alternatives, modifications, and equivalents, as may be included within the spirit and scope of the invention as defined by the appended claims.

DETAILED DESCRIPTION OF INVENTION

The method and system of the present disclosure will now be described more fully hereinafter with reference to the accompanying drawings in which embodiments are shown. The method and system of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout. In an embodiment, usage of the term "about" includes +/−5% of the cited magnitude. In an embodiment, usage of the term "substantially" includes +/−5% of the cited magnitude.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

Shown in a side partial sectional view in FIG. 1 is one example of an electrical submersible pump ("ESP") system 10 disposed within a wellbore 12. In the example, wellbore 12 intersects a formation 13; ESP system 10 is used for pumping fluids produced from within formation 13 to surface. In the example or FIG. 1, casing 14 lines the wellbore 12 and provides a selective barrier between formation 13 and wellbore 12. The fluid from formation 13 can enter wellbore 12 via perforations 15 formed laterally through casing 15.

ESP system 10 of FIG. 1 includes a motor 16 and a seal section 18 coupled to a lower end of motor 16. In the illustrated example, seal section 18 communicates dielectric fluid between itself and motor 16. The dielectric fluid is pressurized to hydrostatic pressure of the well fluid in well bore 12, thereby relieving pressure differential on seals and other components within ESP system 10.

A pump 20 is shown mounted to an end of seal system 18 and on a side opposite from motor 16. In this example, pump 20 is on the lower end of ESP system 10. The configuration of the illustrated ESP system 10 is commonly referred to as an inverted system, i.e. with the motor 16 on its upper end. However, embodiments exist wherein the pump 20 can be on the upper end of ESP system 10. Pump 20 is shown including an inlet 22 on its lower end for receiving fluid therein, and outlet 24 on its upper end, for discharging pressurized fluid.

In examples where pump 20 is a centrifugal pump, a series of coaxially stacked impellers and diffusers (not shown) are provided within the housing of pump 20. A shaft (not shown) connected to motor 20 rotates the impellers, thereby pressurizing fluid received from inlet 22 and pushing the pressurized fluid to the outlet 24. After exiting the outlet 24, the pressurized fluid flows back into production tubing 25 in which the ESP system 10 is disposed. Pump 20 though is not limited to being a centrifugal pump, but can be any type of device for lifting fluid, such as a progressive cavity pump or a positive displacement pump, to name a few.

A packer 26 is shown on the outer surface of pump 20, and which projects radially outward into sealing contact with inner surface of production tubing 25. Packer 26 is set axially between inlet 22 and outlet 24 so that fluid exiting outlet 24 is diverted uphole. In other arrangements, packer 26 could be set in casing 14.

An umbilical 28 is shown depending downward from a wellhead assembly 30 at the opening of wellhead 12 and connecting to an upper end of ESP assembly 10. In one example, ESP assembly 10 is supported in the wellbore 12 by umbilical 28. Umbilical 28 includes a protective outer sheath 32, such as coiled tubing, in which is encased a power line 34 for delivering electrical power to motor 16. An electrical source 36 adjacent wellhead assembly 30 is shown connected to an upper end of power line 34 for supplying electrical power to power line 34. Also shown disposed within umbilical 28 is an upper section of a control line 38, which exits sheath 32 proximate ESP assembly 10. In the illustrated example, control line 38 has an intermediate or internal section that penetrates through a housing 40 of motor 16. A lower section of control line 38 extends from motor 16 further downhole in wellbore 12.

An upper end of the upper section of control line 38 connects to a controller 42 shown disposed outside of wellbore 12 and on surface. Optionally, controller 42 may be disposed within wellbore 12. The lower end of control line 38 connects to a downhole element 44 shown within wellbore 12 and either at the lower end of or downhole of ESP assembly 10. Downhole element 44 may be located below packer 26, as shown. Examples of the downhole element 44 include completion equipment that require signals sent from the surface to perform their intended functions; such as, subsurface safety valves, landing nipples, hydraulically set packers, and gauges. Gauges can include temperature and pressure gauges for monitoring downhole conditions. Moreover, signals sent through the control line can be hydraulic, electrical, or optical. Thus, example mediums of the control line include hydraulics, electrically conducting elements, and fiber optics.

FIG. 2 shows in an axial sectional view one example embodiment of a portion of motor 16 of FIG. 1, and taken along lines 2-2 of FIG. 1. Housing 40 is cylindrical and has a longitudinal axis 45. A stack of motor laminations 46 are non rotatably mounted in housing 40. Motor laminations 46 comprise thin steel disks or laminations having aligned windings slots 48 formed axially through at angularly spaced apart locations around a central bore 47. A series of windings 50 extend through the slots 48; electrical current received from power line 34 is selectively conducted through windings 50. Motor 16 is a three-phase type. Thus windings 50 will include a separate magnet wire for each of the three phases wound in a selected pattern through slots 48. Typically, windings 50 for each phase will be extending through each of the slots 48. Windings 50 form loops at the lower end of the stack of motor laminations 46, and in this example, and connect to power line 34 (FIG. 1) at the upper end. Motor laminations 46 and windings 50 may be referred to as a stator.

A rotor 52 is coaxially disposed and rotates within central bore 47 of motor laminations 46. Rotor 52 comprises a slack of planar disks or laminations having slots or holes 54 axially formed therethrough that are spaced angularly away from each other. In the illustrated example, holes 54 are shown having a solid electrically conducting core or rod 56 provided therein. Holes 54 may be other shapes than shown, such as circular. Rotor 52 circumscribes and connects to a shaft 58. The electromagnetic fields produced by the stator causes rotor 52 to rotate to drive pump 20 (FIG. 1).

Further shown in motor lamination 46 are a series of outer slots or channels 51 that are set radially outward from slots 48 and on the outer diameter of motor laminations 46 proximate the inner surface of housing 40. Channels 51 are open on the outer diameter. The inner surface of housing 40 serves as a closure for each of the openings of channels 51. Channels 51 are shown as being rectangular, but may have other shapes. Each channel 51 extends the length of stator 46 parallel with the longitudinal axis. Three channels 51 are shown, each 120 degrees apart from the others. Each channel 51 may be intersected by a radial line that passes between two of the slots 48.

A set of three separate internal control lines 38a, 38b and 38c passes through the stack of motor laminations 48. In FIG. 2, each control line 38a, 38b and 38c is located in one of the channels 60. Each control line 38a, 38b, 38c is thus 120 degrees apart from the others and equally spaced around axis 45. Routing control fines 38a, 38b and 38c through channels 51 keeps the control lines inside of housing 40, which provides a protective covering to control lines 38 and avoids the placement of control lines 38 in regions where control lines are vulnerable to damage.

Each control line 38a, 38b and 38c may have a metallic ferrous or electromagnetic component that is influenced by the electromagnetic fields produced by windings 50. Positioning the control lines 38a, 38b and 38c 120 degrees apart balances the effects that the metallic component has on the electromagnetic fields. The balance provided allows motor 16 to operate more efficiently than if a single control line with a ferrous metallic component passed through the stack of motor laminations 46.

FIG. 3 illustrates one example of one or more of the internal control lines 38a, 38b and 38c. The control line in FIG. 3 is an electrical wire having a metallic conductor 60, preferably copper, surrounded by an electrical insulation 62. A woven sheath or solid steel tube 63 optionally surrounds insulation 62. Sheath 63 may be formed of a ferrous material, such as steel, to avoid the electromagnetic field of windings 50 affecting electrical signals passing though conductor 60. One or more of the internal control lines 38a 38b, and 38c (FIG. 2) could be constructed as shown in FIG. 3.

FIG. 4 illustrates another example of one or more of the internal control line 38a, 38b and 38c. The control line in FIG. 4 comprises a fiber optic line or wire 64 surrounded a protective tube 66 optionally of a ferromagnetic material, such as steel. Protective tube 66 may provide an influence on the electromagnetic field of windings 50 that is preferably balanced by ferromagnetic components in the other channels 51 (FIG. 2). One or more of the internal control lines 38a, 38b and 38c (FIG. 2) could be constructed as shown in FIG. 4.

In FIG. 5, the control line is a hollow tube 67 optionally formed of a ferromagnetic material such as steel. Tube 67 is a capillary tube typically employed to convey hydraulic thud pressure to operate downhole element 44 (FIG. 1). One or more of the internal control lines 38a, 38b and 38c (FIG. 2) could be constructed as shown in FIG. 5.

Figure 6:
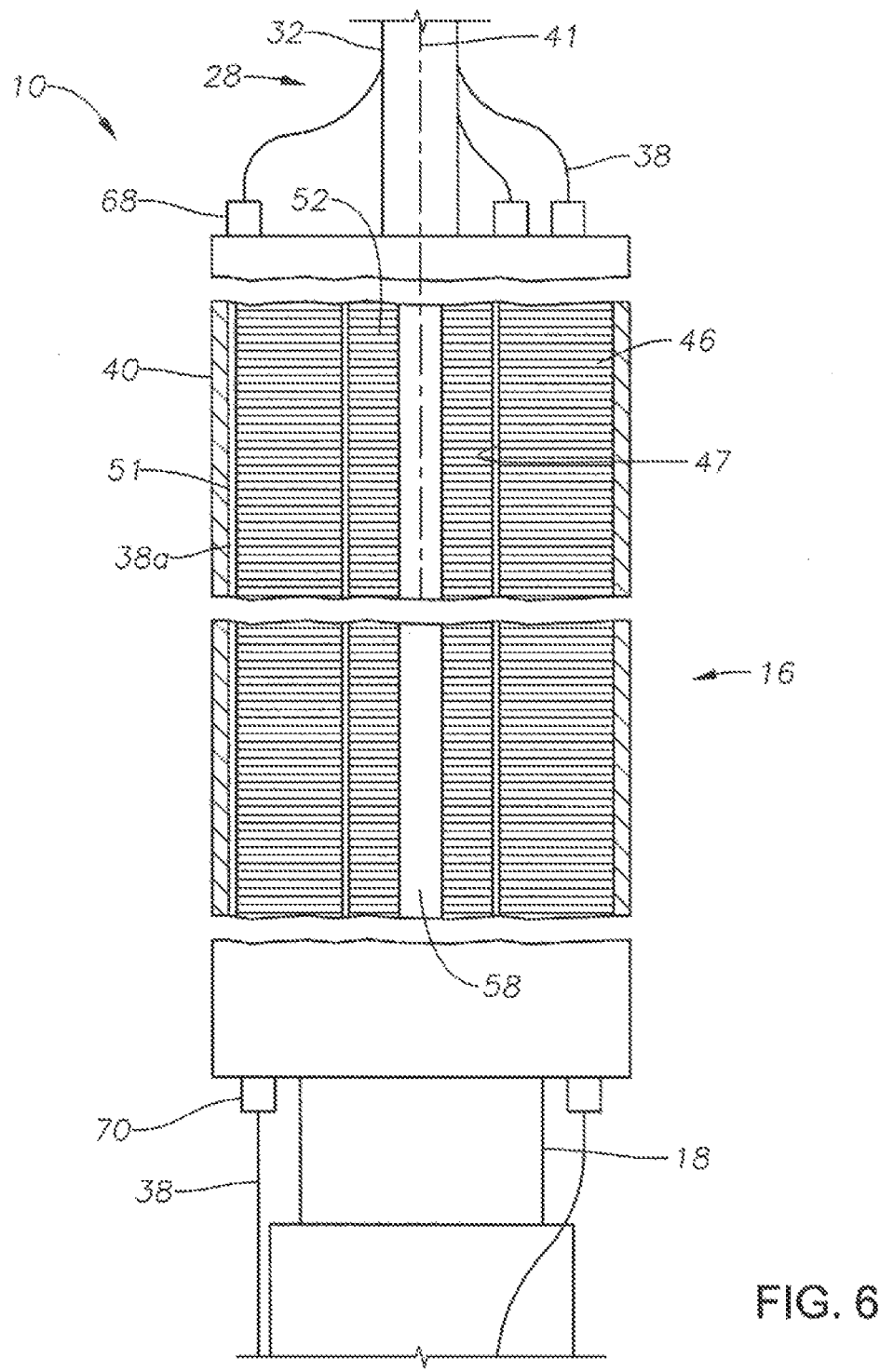
FIG. 6 is a partial sectional and schematic view of the ESP system of FIG. 2, taken along the line 6-6 of FIG. 2.

Referring now to FIG. 6, an example of ESP assembly 10 is shown in a schematic side sectional view. As illustrated, motor laminations 46 are stacked upon one another inside housing 40. Similarly, the laminations of rotor 52 are axially stacked on one another to define a rotor section. Rotor 52 will be formed in sections (only one shown) having lengths, for example, of one to two feet. The rotor sections are separated by radial bearings (not shown). Rotor 52 rotates within bore 47 of stator 46. An annular clearance exists between rotor 52 and motor laminations 46. By routing electricity through windings 50 (FIG. 2) electromagnetic fields are produced that induce rotation of rotor 52 with respect to the stator made up of motor laminations 46 and windings 50. As rotor 52 is coupled to shaft 58, rotating rotor 52 thereby rotates shaft 58, which in turn drives pump 20 (FIG. 1).

Further shown in FIG. 6 are three upper connectors 68 that mount on the outer surface of housing 40, preferably the upper end, and provide a sealing connection for the upper sections of control lines 38 to enter into housing 40. Three lower connectors 70 mount on a lower end of housing 40 that provides fluid seals so that the lower sections of control lines 38 can exit housing 40 on their way downward into connection with a downhole element 44 (FIG. 1). Upper and lower connectors 68, 70 may be spaced 120 apart from each other and axially aligned with the internal control lines 38a, 38b and 38c.

Thus in one example, in instances where downhole element 44 requires actuation, a control signal may be initiated from controller 42 and transmitted to one of the control lines 38. As explained above, each control line 38 extends downhole in the wellbore 12 within umbilical 28 and routes through motor 16 and packer 26 to downhole element 44. The signal communicates with downhole element 44 for performing the intended function of the downhole element 44.

By routing internal sections of control lines 38 through motor 16, the annular space between housing 40 and inner surface of production tubing 25 may be kept free of any control lines 38, thereby allowing a larger sized pump 16. Routing of control lines 38 as described herein also prevents damaging control lines 38 that may occur when motor 16 is inadvertently collided with other solid substances, such as the inner surface of production tubing 25.

Figure 7:
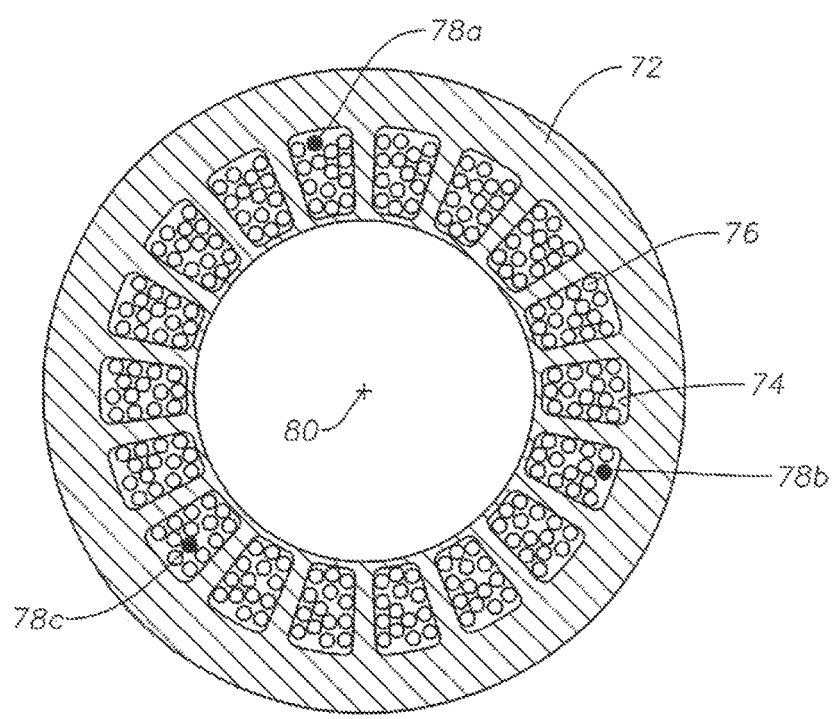
FIG. 7 is a sectional view of an alternate embodiment to FIG. 2 of motor laminations and control lines.

In the alternate embodiment of FIG. 7, a stack of motor laminations 72 differs from the stack of motor laminations 46 (FIG. 2) in that there is no need for channels 51 on the outer diameter. Motor laminations 72 have windings slots 74 spaced evenly around a central bore. Magnet wires or motor windings 76 are wound through slots 74 in the same manner as in the embodiment of FIG. 2.

In FIG. 7, three internal control lines 78a, 78b and 78c extend through three of the windings slots 74 along with windings 76. Control lines 78a, 78b and 78c are schematically illustrated as darkened circles to distinguish them from windings 76. Internal control lines 78a, 78b and 78c are located 120 degrees apart from each other relative to axis 80. Internal control lines 78a, 78b and 78c may have ferromagnetic components and may comprise one or more of the control lines illustrated in FIGS. 3, 4 and 5.

The 120 degree spacing of the internal control lines avoids affecting the three-phase electromagnetic field by the extra amount of ferrous material of each control line 38 within the particular slot 48. The internal control lines may be in multiple sets, each set having three control lines spaced 120 degrees apart. For example, internal control lines 38 may pass through motor 16 in multiples of three, such as six or nine, equally spaced in order to maintain symmetry. For example, if two sets of internal control lines are employed, the control lines within each set may be 120 degrees apart from each other and 60 degrees from control lines in the other set.

The present invention described herein, therefore, is well adapted to carry out the objects and attain the ends and advantages mentioned, as well as others inherent therein. While a presently preferred embodiment of the invention has been given for purposes of disclosure, numerous changes exist in the details of procedures for accomplishing the desired results. For example, the control line 38 and power line 34 may be disposed outside of and separate from umbilical 32. These and other similar modifications will readily suggest themselves to those skilled in the art, and are intended to be encompassed within the spirit of the present invention disclosed herein and the scope of the appended claims.

The invention claimed is:

1. An electrical submersible pumping ("ESP") system comprising:
   a well fluid pump:
   a three-phase motor operatively connected to the pump and comprising;
   a housing having a longitudinal axis;
   a stack of motor laminations mounted in the housing, the motor laminations having axially aligned slots spaced circumferentially around a bore;
   motor windings wound through the slots for receiving three-phase power provided to the motor;

at least one set of three control lines extending axially through the motor laminations and equally spaced around the axis; and wherein each of the control lines has a ferrous component that is influenced by electromagnetic fields produced by the motor windings.

2. The system according to claim 1, further comprising:
at least one set of three upper control line connectors at an upper end of the motor;
at least one set of three lower control line connectors at a lower end of the motor; and wherein
each of the control lines extends between one of the upper control line connectors and one of the lower control line connectors.

3. The system according to claim 1, further comprising:
a downhole element mounted below the motor; and wherein;
each of the control lines extends to the downhole element.

4. The system according to claim 1, further comprising:
a controller adapted to be mounted adjacent a wellhead; and
wherein the control lines extend to the controller.

5. The system according to claim 1, wherein:
at least one of the control lines comprises an insulated electrical wire, and
the ferrous component comprises a metallic sheath surrounding the insulated electrical wire.

6. The system according to claim 1, wherein:
at least one of the control lines comprises a fiber optic line, and
the ferrous component comprises a metallic tube enclosing the fiber optic line.

7. The system according to claim 1, wherein:
at least one of the control lines comprises a tube having a passage for conveying a fluid; and
the ferrous component comprises the tube.

8. The system according to claim 1, further comprising:
at least one set three axially aligned channels extending axially along an outer diameter of the motor laminations and equally spaced around the axis, the channels being spaced radially outward from the slots; and
each of the control lines extends through one of the axially aligned channels.

9. The system according to claim 1, wherein:
each of the control lines extends through one of the slots that also contains some of the motor windings.

10. An electrical submersible pumping ("ESP") system comprising:
a well fluid pump;
a three-phase motor operatively connected to the pump and comprising;
a housing having a cylindrical internal surface concentric with a longitudinal axis of the housing;
a stack of motor laminations mounted in the housing, the motor laminations having axially aligned slots spaced circumferentially around a bore, the motor laminations having an outer diameter in contact with the internal surface of the housing;
motor windings wound through the slots for receiving three-phase power provided to the motor;
three axially aligned channels on the outer diameter of the motor laminations radially outward from the slots, the channels being spaced 120 degrees apart from each other;
three internal control lines, each extending axially through one of the channels, each of the internal control lines having a ferrous component that is influenced by electromagnetic fields produced by the windings;

three upper connectors mounted at an upper end of the housing, each of the internal control lines being connected to one of the upper connectors;
three upper control lines, each connected to one of the upper connectors for extending upward to a wellhead;
three lower connectors mount at a lower end of the housing, each of the internal control lines being connected to one of the lower connectors; and
three lower control lines, each connected to one of the lower connectors for extending downward to a downhole element.

11. The system according to claim 10, further comprising:
a controller adapted to be mounted adjacent the wellhead; and
wherein the upper control lines extend to the controller.

12. The system according to claim 10, wherein:
at least one of the internal control lines comprises an insulated electrical wire; and
the ferrous component comprises a steel outer layer surrounding the insulated electrical wire.

13. The system according to claim 10, wherein:
at least one of the internal control lines comprises a fiber optic line; and
the ferrous component comprises a steel tube surrounding the fiber optic line.

14. The system according to claim 10, wherein:
at least one of the internal control lines comprises a steel tube having a passage for conveying a fluid; and
the ferrous component comprises the steel tube.

15. An electrical submersible pumping ("ESP") system comprising:
a well fluid pump;
a three-phase motor operatively connected to the pump and comprising;
a housing having a longitudinal axis;
a stack of motor laminations mounted in the housing for non rotation relative to the housing, the motor laminations having axially aligned slots spaced circumferentially around a bore;
motor windings wound through the slots for receiving three-phase power provided to the motor;
three internal control lines, each extending axially through one of the slots along with some of the windings, the internal control lines being spaced 120 degrees apart from each other relative to the axis;
each of the internal control lines having a ferrous component that is influenced by electromagnetic fields produced by the windings;
three upper connectors mounted at an upper end at the housing, each of the internal control lines being connected to one of the upper connectors;
three upper control lines, each connected to one of the upper connectors for extending upward to a wellhead;
three lower connectors mount at a lower end of the housing, each of the internal control lines being connector to one of the lower connectors; and
three lower control lines, each connected to one of the lower connectors for extending downward to a downhole element.

16. The system according to claim 15, further comprising:
a controller adapted to be mounted adjacent the wellhead; and
wherein the upper control lines extend to the controller.

17. The system according to claim 15, wherein:
at least one of the internal control lines comprises an insulated electrical wire; and
the ferrous component comprises in a steel outer layer surrounding the insulated electrical wire.

18. The system according to claim 15, wherein:
at least one of the internal control lines comprises a fiber optic line; and
the ferrous component comprises a steel tube surrounding the fiber optic line.

19. The system according to claim 15, wherein:
at least one of the internal control lines comprises a steel tube having a passage for conveying a fluid; and
the ferrous component comprises the tube.

* * * * *